(12) United States Patent
Yin

(10) Patent No.: US 9,769,775 B2
(45) Date of Patent: Sep. 19, 2017

(54) SYNC INTERVAL DETERMINATION

(75) Inventor: Hui Yin, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 203 days.

(21) Appl. No.: 14/353,324

(22) PCT Filed: Nov. 11, 2011

(86) PCT No.: PCT/CN2011/001886
§ 371 (c)(1),
(2), (4) Date: Apr. 22, 2014

(87) PCT Pub. No.: WO2013/067655
PCT Pub. Date: May 16, 2013

(65) Prior Publication Data
US 2014/0269673 A1    Sep. 18, 2014

(51) Int. Cl.
*H04W 56/00*    (2009.01)
*H04J 3/06*    (2006.01)

(52) U.S. Cl.
CPC ........... *H04W 56/00* (2013.01); *H04J 3/0667* (2013.01)

(58) Field of Classification Search
None
See application file for complete search history.

(56) References Cited

U.S. PATENT DOCUMENTS

| | | | |
|---|---|---|---|
| 2009/0168808 A1* | 7/2009 | Cho | .......................... G04G 7/00 370/503 |
| 2010/0098111 A1 | 4/2010 | Sun et al. | |
| 2011/0013737 A1 | 1/2011 | Lee et al. | |

FOREIGN PATENT DOCUMENTS

| | | |
|---|---|---|
| CN | 1852049 | 10/2006 |
| CN | 101043277 | 9/2007 |
| CN | 101252429 A | 2/2008 |
| CN | 101252429 | 9/2010 |

OTHER PUBLICATIONS

Extended European Search Report issued by the EPO for Application No./Patent No. 11875461.3-1851 / 2777183 PCT/CN2011001886, Jun. 10, 2015.

(Continued)

*Primary Examiner* — Rhonda Murphy
(74) *Attorney, Agent, or Firm* — Baker Botts, LLP

(57) ABSTRACT

The invention relates to a method of synchronizing clocks of at least two devices in a network and a corresponding wireless device for synchronizing its clock with another wireless device. The method comprises steps of: transmitting a synchronization signal to said at least one second device to determine at least one time offset between a clock of the first device and at least one clock associated with said at least one second device; receiving said at least one time offset from said at least one second device; determining a time interval for the first device based on a time offset parameter corresponding to said at least one time offset, after which time interval the first device transmits a next synchronization signal to said at least one second device. With this method, the radio station is able to reduce its power consumption when the time offset between the first device and the second device is small.

20 Claims, 2 Drawing Sheets

(56) References Cited

OTHER PUBLICATIONS

PCT International Search Report for International Application No. PCT/CN2011/001886, Aug. 23, 2012.
PCT Notification of Transmittal of International Preliminary Report on Patentability for International Application No. PCT/CN2011/001886, Jan. 29, 2014.
PCT Chapter II Demand and Response to ISR/WO for International Application No. PCT/CN2011/001886, Aug. 28, 2013.
"Overview and Timing Performance of IEEE 802.1AS" by Michael D. Johas Teener and Geoffrey M. Garner, Sep. 22-26, 2008.
IEEE Standard for a Precision Clock Synchronization Protocol for Networked Measurement and Control Systems (IEEE Instrumentation and Measurement Society); IEEE Std 1588 Jul. 24, 2008.
Intl. Appln. 201180074768.8, Chinese Office Action (with translation) with Search Report, dated Aug. 31, 2016.

* cited by examiner

SYNC INTERVAL DETERMINATION

PRIORITY

This nonprovisional application is a U.S. National Stage Filing under 35 U.S.C. § 371of International Patent Application Ser. No. PCT/CN2011/001886, filed Nov. 11, 2011 and entitled "Sync Interval Determination."

TECHNICAL FIELD

The invention relates to a method of synchronizing clocks of at least two devices in a network and a corresponding wireless device for synchronizing its clock with another wireless device.

BACKGROUND

Time synchronization is a very important issue for mobile communication systems, especially for TD-SCDMA, WiMAX or LTE systems. Generally these communication systems need time accuracy within several microseconds (μs).

GPS (Global Positioning System) has been widely used by a verity of devices to get an accurate time clock, and now is used for time synchronization for RBS (Radio Base Station). It is a satellite based Global Positioning System developed by the US Department of Defense.

But the application of GPS system is limited by its satellite communication mechanism. For example, the GPS system has difficulty in site selection, especially for in-door RBS, where the satellite signal from the GPS system is too weak to be detected. In addition, since the GPS system is controlled by the US Department of Defense, its security and availability are under consideration for other countries and organizations.

To free the synchronization from the satellite communication, a plurality of synchronization methods have been proposed. Among them, IEEE 1588 is proposed to synchronize real-time clocks in the nodes of a distributed system that communicate using a network. It enables precise synchronization of clocks in measurement and control systems implemented with technologies such as network communication, local computing and distributed objects. The clocks communicate with each other over a communication network. The protocol generates a master-slave relationship among the clocks in the system. The clock of a slave device is synchronized to the clock of its master device, and all clocks ultimately derive their time from a clock known as the grandmaster clock.

IEEE 1588 protocol eliminates the needs of communication to a satellite system and has been extensively investigated to be used in all kinds of networks. It can be either used to replace some GPS or as a complementation when GPS is not detected. For example, for Femto-cell, synchronization by means of IEEE 1588 protocol will be more reliable than using GPS since GPS signal might be too small to be detected.

In the IEEE 1588 protocol, each slave synchronizes to its master using Sync, Follow_Up, Delay_Req, and Delay_Resp messages. The 'sync' message is sent periodically (2 seconds in default) from the master device to the slave device to update the clock information at the slave device.

When the slave clock is accurate, the frequent transmission of sync message will waste the communication bandwidth in the network and also consume the calculation power in the slave device to perform corresponding operations. On the other hand, when the slave clock is not accurate or stable, it may result in a relatively large time offset between the master clock and the slave clock.

SUMMARY

It is the object of the invention to avoid the disadvantages mentioned above and to provide an improved method of synchronizing clocks of at least two wireless devices in a network.

According to a first aspect of the invention, there is provided a method for synchronizing a first device with at least one second device. The first device transmits a synchronization signal to said at least one second device to determine at least one time offset between a clock of the first device and at least one clock associated with said at least one second device, receives said at least one time offset from said at least one second device; and determines a time interval for the first device based on a time offset parameter corresponding to said at least one time offset, after which time interval the first device transmits a next synchronization signal to said at least one second device.

Such a method is suitable for a radio station receiving data signals. By dynamically determining the sync interval based on the time offset of the second clock, the messages can be optimally scheduled and the radio station is able to reduce its power consumption when the time offset between the first device and the second device is small. According to one embodiment, the first device is a master device and the second device is a slave device whose clock is synchronized to the master clock of the master device.

According to an embodiment, there is only one second device and said time offset parameter equals to said at least one time offset. With the present method, the frequency of transmitting the unicast synchronization messages are balanced with the time offset between the first device and the second device. Alternatively there may be more than one second devices, and said time offset parameter equals to an averaging value of said at least one time offset or the smallest one of said at least one time offset. The determination of the frequency of multicasting the synchronization messages has taken the behavior of all the slave devices.

Preferably, the master device further receives a request message from a first one of said at least one second device, transmits a response message to said first second device to inform a fourth time point of receiving said request message at the first device. The synchronization signal comprises information about a first time point of transmitting the synchronization signal at the first device. A first one of said at least one time offset is determined based on the first time point, the fourth time point, a second time point of receiving said synchronization signal at the first second device, and a third time point of transmitting said request message from the first second device.

According to one embodiment, the slave device determines the time offset value and uses it to adjust its slave clock. A report message containing the slave time offset can be sent to the master after the time offset is determined by the slave device. This option is useful in cases where it is not possible both to achieve sufficient time stamp accuracy and place the time stamp in the message as it is transmitted.

According to another embodiment, the master device receives a request message from a first one of said at least one second device, which includes the information about a second time point of receiving said synchronization signal at the first second device and a third time point of transmitting said request message from the first second device, and notes a fourth time point of receiving said request message at the first device. Then the master device determines a first one of said at least one time offset based on the first time point, the second time point, the third time point and the fourth time point.

According to a second aspect of the present invention, there provides a synchronization method for synchronizing a first device with a second device. The method comprises the steps of: transmitting a synchronization signal from a first device to a second device; transmitting a follow up message from the first device to the second device, indicating a first time point (t1) of transmitting the synchronization signal; transmitting a request message from the second device to the first device; transmitting a response message from the first device to the second device to inform the fourth time point (t4) of receiving said request message at said first device; determining at least one time offset between a clock of the first device and a clock associated with said second device according to the first time point (t1), a second time point (t2) of receiving said synchronization signal at the second device, a third time point (t3) of transmitting said request message, and the fourth time point (t4); receiving said at least one time offset from said second device; and determining a time interval for the first device based on a time offset parameter corresponding to said at least onetime offset, after which time interval the first device transmits a next synchronization signal to said second device.

According to the third aspect of the present invention, there provides a first device for synchronizing with at least one second device. Said first device comprises a transmitter for transmitting a synchronization signal to said at least one second device to determine at least one time offset between a clock of the first device and at least one clock associated with said at least one second device; a receiver for receiving said at least one time offset from said at least one second device; and a time interval determination unit for determining a time interval for the first device based on a time offset parameter corresponding to said at least one time offset, after which time interval the transmitter transmits a next synchronization signal to said at least one second device.

Other objects and features of the present invention will become apparent from the following detailed descriptions considered in conjunction with the accompanying drawings. It is to be understood, however, that the drawings are designed solely for the purposes of illustration and not as a definition of the limits of the invention.

DETAILED DESCRIPTION

Figure 1:
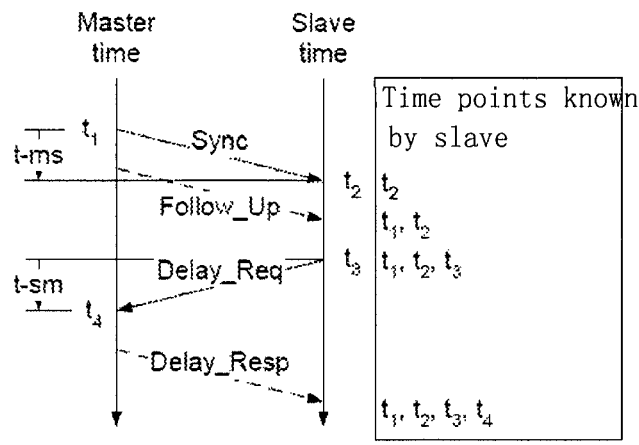
FIG. 1 is a timing diagram of a Delay-Request-Response mechanism according to the IEEE 1588 protocol.

FIG. 1 is a timing diagram of a basic Delay-Request-Response mechanism. In FIG. 1, Master time refers to the time according to a clock of a master device, and Slave time refers to the time according to a clock of a slave device.

After a device has been selected as the master device, for example, by using the Best Master Clock algorithm, the master device at first sends a synchronization message (Sync) to its slave at time point t1. Then the master device sends a follow up message after the transmission of the associated synchronization message, which includes the precise information about t1. Both the synchronization message and the follow up message are received by a slave device. The slave device notes the receipt time point t2 of the synchronization message, and derives the value of t1 from the follow up message. Then the apparent time difference between the two clocks can be measured by the slave device $$T_{-MS} = \text{offset} + MS\ \text{delay} = t2 - t1. \tag{1}$$

It should be noted, the follow up message is optional. According to another embodiment of the present invention, the value of t1 is embedded in the synchronization message and there is no follow up message associated with the sync message. However in this case, it requires some sort of hardware processing for highest accuracy and precision.

Secondly, the slave device sends a request message (Delay_Req) to the master device at time point t3, and notes t3 in its memory. The master device receives the request message and notes the time of reception t4. Then the master device generates a response message (Delay_Resp) corresponding to the request message. In the response message, the value of t4 is conveyed to the slave device.

After the receipt of the response message from the master device, the slave device now possess information about four time points, t1, t2, t3 and t4. The values of the time points t1 and t4 are measured using the time clock of the master device, and the values of the time points t2 and t3 are measured using the time clock of the slave device. Thus we get another apparent time difference between the two clocks:

$$T_{-SM} = -\text{offset} + SM\ \text{delay} = t4 - t3. \tag{2}$$

These timestamps may be used by the slave device to compute the offset of the slave clock with respect to the master and the mean propagation time of messages between the two clocks.

Assuming the link is symmetric, i.e. MS delay=SM delay, the time offset between master and slave clock and propagation delay can then be derived according to the following equation:

$$\text{Offset} = (\text{Slave time}) - (\text{Master time}) = [(t_2 - t_1) - (t_4 - t_3)]/2 \tag{3}$$

$$\text{Delay} = [(t_2 - t_1) + (t_4 - t_3)]/2 \tag{4}$$

Knowing the Offset value, the slave device may adjust its clock and synchronize to the master device.

Figure 2:
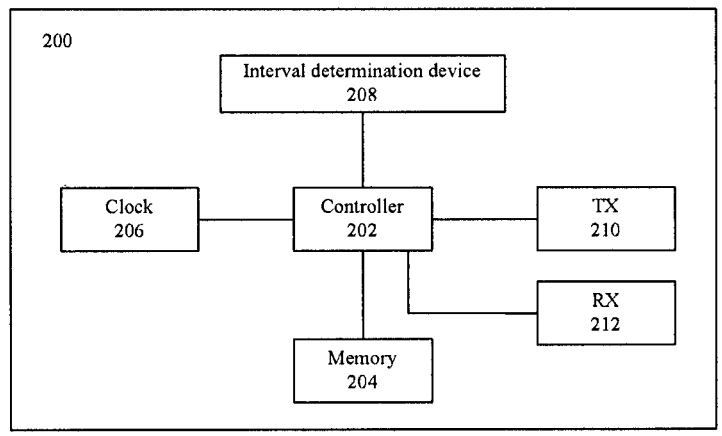
FIG. 2 is a block diagram of a master device for sending sync messages according to an embodiment of the present invention.

FIG. 2 is a block diagram of a master device for sending sync messages according to an embodiment of the present invention, and the master device is designated generally as master device 200. With reference to FIG. 2, the master device 200 includes a controller 202, a memory 204, a clock 206, an interval determination device 208, a transmitter 210 and a receiver 212. The controller 202 controls the communication functions of the master device 200 and coordinates all the components of the master device to work together. The memory 204 is used to save some necessary system information. The clock 206 is selected as the master clock, to which all the slave clocks synchronize to. The transmitter 210 is used to transmit various messages from the master device. For example, the transmitter 210 transmits, among others, event messages, such as the synchronization message, the follow-up message and the response message as mentioned with reference to FIG. 1. The receiver 212 is used to receive a variety of messages from the other devices, including a grandmaster device or the slave devices. The receiver 212 may receive, among others, some event messages such as the response message from the slave device and general messages from other devices to perform clock selection. The interval determination device 208 is used to determine the time interval between the transmissions of two successive synchronization messages. This interval is very important to the whole synchronization system because all the timing is centered around the synchronization interval.

Figure 3:
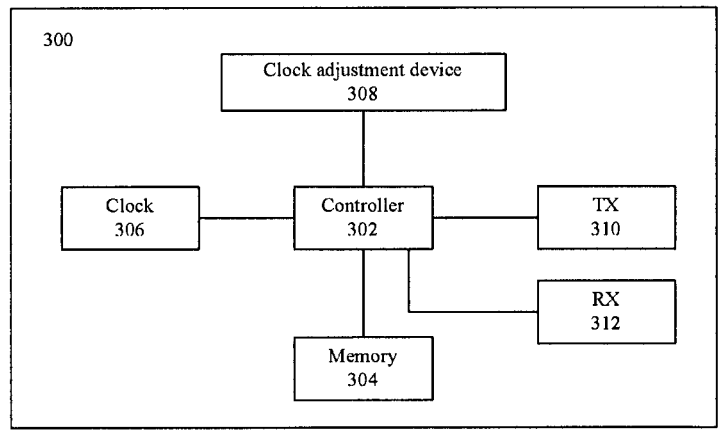
FIG. 3 is a block diagram of a slave device for receiving the sync message according to an embodiment of the present invention.

FIG. 3 is a block diagram of a slave device which may be configured to implement an embodiment of the present invention and generally designated as slave device 300. The slave device 300 includes a controller 302, a memory 304, a clock 306, a clock adjustment device 308, a transmitter 310 and a receiver 312. The controller 302 controls the communication functions of the slave device 300 and coordinates all the components of the slave device. The transmitter 310 is used to transmit various messages from the slave device 300 to the master device 200, and the receiver 312 is used to receive a variety of messages from the master devices. The transmitter may transmit, among others, a report message to inform the master device of the time offset value between the slave clock and the master clock. The time adjustment device 308 determines the time offset between the slave clock 306 and the master clock 206, and the time delay from the master device to the slave device, and uses the time offset to adjust the clock 306 so as to synchronize to the master clock.

Although the master device 200 and the slave device 300 are described separately for clarity, the skilled person in the art may understand that the master device and the slave device is exchangeable in its roles, and every device in the network may be chosen as the master device, and the other devices in the network synchronize to the selected master device. The master clock can be selected by using for example the Best master clock algorithm. The algorithm determines which of the clocks described in several Announce messages is the best clock. In determination of the best clock, the algorithm may take into consideration the priority, the accuracy, the stability and the traceability.

Below we will describe the functions of each component with reference to FIGS. 2 and 3.

After the clock 206 of the master device 200 has been selected as the master clock of the network, the transmitter 210 broadcasts a synchronization message at time point t1 to inform all the other devices in the network. The synchronization message may include an estimate of the sending time of the sending time t1. The transmitter 210 is also configured to transmit a corresponding follow up message after the transmission of the synchronization message to inform the slave device of the precise value of sending the synchronization message, t1.

The synchronization message and the follow up message are received by the slave device 300 through its receiver 312. The slave controller notes the receipt time point t2 of the synchronization message and derives the value of time point t1 from the follow up message.

Then the slave device 300 sends a request message to the master device 200 through the slave transmitter 310 at time point t3, in response to the receipt of the synchronization message. The master receiver 212 receives the request message (Delay_Req) from the slave device 300. The controller 202 notes the time of reception t4 of the request message and includes the value of t4 into a response message (Delay_Resp), which is also transmitted by the transmitter 210 to the slave device 300. With the value of t1, t2, t3 and t4, the time adjustment device 308 may determines the time offset and the time delay according to F3 and 4, and adjusts the slave clock 306 based on the time offset thus determined, so as to synchronize to the master clock 206. The time offset is also transmitted by the slave device 300 through a report message to the master device 200. Preferably the time offset is transmitted to the master device 200 as soon as it is derived.

The receiver 212 receives the time offset message from the slave device, and sends said the time offset to the interval determination device 208. The interval determination device 208 then determines a time interval of the master device based on the time offset. According to one embodiment, the time interval is determined according to the following formulation $$T_{syncinterval}=T_{syncint0}*(t_{ref}/t_{para}) \text{ if } t_{refL} \le \text{tpara} \le t_{refH} \quad (5)$$

wherein $T_{syncint0}=2$ s is a default time interval of the master device; $t_{ref}$ is a reference time offset of 1 µs; $t_{para}$ is a time offset parameter, which is the time offset value received in this embodiment; $T_{refL}$ and $T_{refH}$ are the lower and upper limits of the time offset parameter respectively.

Then the time interval determined above is used by the controller 202 to determine when to send the next synchronization message. For example, when the time offset of a slave clock is 1 us, we use a sync interval of 2 s, and then when the time offset is 0.5 us, we can use a sync interval of 4 s, as so on. Preferably the time interval is set between 0.5 s~5 s, and the values of $T_{refL}$ and $T_{refH}$ are set to be 0.4 µs and 4 µs, respectively. When the time offset value is greater than $T_{refH}$, the time interval is set to 0.5 s, and when the time offset value is smaller than $T_{refL}$, the time interval is set to 5 s. Depending on the network load, i.e., how many slave clocks need to be synchronized in this network and the requirement on accuracy, the skilled person in the art may choose other values of these parameters, which also fall in the scope of the present invention.

By dynamically determining the time interval between two successive synchronization messages, the messages can be optimally scheduled and the communication traffic between the master device and the slave device may be optimized by sending the next synchronization after a longer time interval when the time offset of the slave device is small. By sending the next synchronization after a shorter time interval when the time offset of the slave device is large, it ensures timely synchronization for inaccurate slave clocks.

The skilled person in the art may understand that the time interval values can be predetermined and stored in a lookup table. A corresponding entry in the lookup table can be found according to the current time offset range.

Alternatively, the time interval can be determined by a moving average method. The n-th time interval between sending the n-th synchronization message and the (n-1)-th synchronization message may be determined from the (n-1)-th time interval: $T_{syncinterval(n)}=T_{syncinterval(n-1)}+k*(t_{para}-t_{ref})$, wherein k is a scaling factor, n is an integer bigger than 1.

According to another embodiment of the present invention, there are a plurality of slave devices 200, each sending its time offset value relative to the master clock. The master device may store all the time offset values in its memory 204, and determines the interval based on a time offset parameter corresponding to the time offset values of the plurality of slave device. For example the time offset parameter is the average value of all the time offsets received to ensure the transmission of synchronization message is appropriate to most of the slave devices. The average value may be selected according to the least square method, so as to minimize the sum of the squares of the errors between the average value $t_{para}$ and the actual time offsets $t_1$ to $t_n$ $$\sum_{i=1}^{n}(t_{para}-t_i)^2,$$

wherein n is the number of the plurality of slave devices and $t_i$ is the time offset received from the $i^{th}$ slave device.

According to a further embodiment of the present invention, the slave device may also transmits the values of time point t2 and time point t3 to the master device, for example, by including these values into a request message. Then the master device can determine the time offset between the master clock and a particular slave clock associated with said request message, and therefore determine the synchronization interval based on said time offset.

Figure 4:
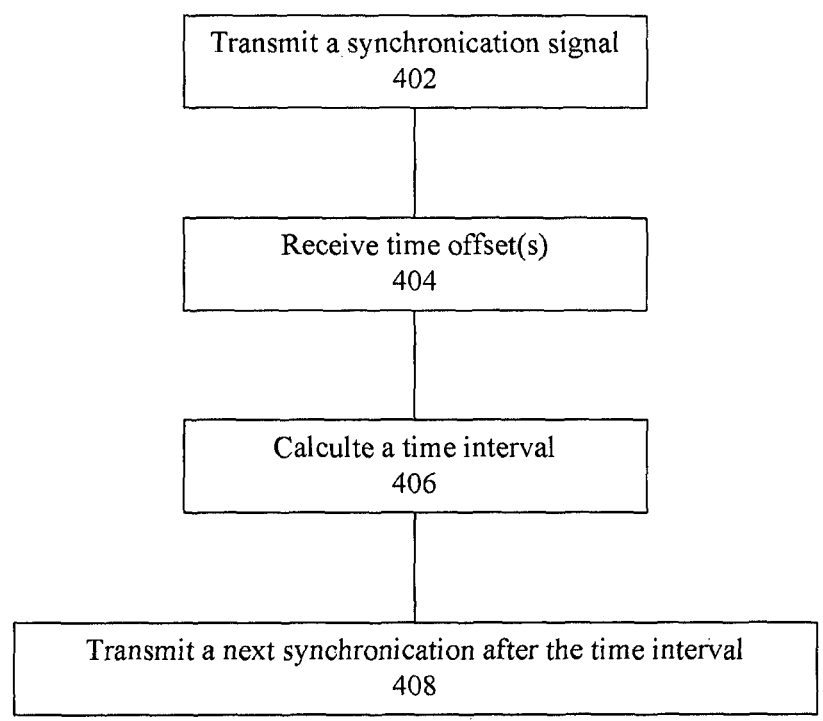
FIG. 4 is a flow chart of an exemplary method of performing the synchronization method, according to an embodiment of the present invention.

FIG. 4 is a flow chart of an exemplary method of performing the synchronization method, according to an embodiment of the present invention. At step 402, the method starts with transmitting a synchronization signal to at least one slave device. The slave device may synchronize to the master clock by the message flow as described with reference to FIG. 1. With this synchronization-request-delay mechanism, the time offset between the slave clock and the master clock is derived. At step 404 the master device 200 receives the time offset from the slave device 300. Said time offset can be conveyed by a report message.

At step 406, the master device 200 calculates a time interval based on the time offset. The time interval is the time period between the transmission of the previous synchronization signal and the transmission of the next synchronization signal. The calculation of the time interval can be conducted as described above. According to one embodiment, there is only one slave device, or the master device unicasts its event messages to a particular slave device. The single time offset from said slave device is sufficient to determine the timer interval between two successive sync messages.

According to another embodiment, the first sync message is multicast to a plurality of slave devices and received by more than one slave devices. Then the master device will receive more than one time offsets. In this case, the master device may use the average value of these time offsets in responsive to the first sync message to calculate the time interval. Alternatively the master device may also use the smallest one of these time offsets to calculate the time interval. At step 408, the master device sends the next synchronization message to the slave device(s) after the time interval has expired since the transmission of the previous synchronization message.

Although various aspects of the invention are set out in the accompanying independent claims, other aspects of the invention may include any combination of features from the described embodiments and/or variants and/or the accompanying dependent claims with the features of the independent claims, and not solely the combinations explicitly set out in the accompanying claims.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. The devices herein are amongst others described during operation. As will be clear to the person skilled in the art, the invention is not limited to methods of operation or devices in operation.

It should be noted that the above-mentioned embodiments illustrate rather than limiting the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for synchronizing a first device with at least one second device, comprising steps of:

transmitting a synchronization signal to said at least one second device to determine at least one time offset between a clock of the first device and at least one clock associated with said at least one second device;

receiving said at least one time offset from said at least one second device;

determining a time interval between the transmission of the synchronization signal and a next synchronization signal, the synchronization signal and the next synchronization signal being successive synchronization signals transmitted from the first device to the at least one second device, the time interval determined based on a time offset parameter corresponding to said at least one time offset received from the at least one second device; and at the time interval, transmitting the next synchronization signal from the first device to said at least one second device.

2. A method as claimed in claim 1, wherein there is only one second device and said time offset parameter equals to said at least one time offset.

3. A method as claimed in claim 2, wherein the time interval is determined as $$T_{syncinterval}=T_{syncint0}*(t_{ref}/t_{para}) \text{ if } t_{refL}\leq tpara \leq t_{refH}$$

wherein $T_{syncint0}$ is a default time interval of the first device; $t_{ref}$ is a reference time offset; $t_{para}$ is said time offset parameter; $T_{refL}$, and $T_{refH}$ are the lower and upper limits of the time offset parameter respectively.

4. A method as claimed in claim 1, wherein there are more than one second devices, and said time offset parameter equals to an averaging value of said at least one time offset or the smallest one of said at least one time offset.

5. A method as claimed in claim 1, further comprising steps of:

upon receipt of a request message from a first one of said at least one second device, transmitting a response message to said first second device to inform a fourth time point of receiving said request message at the first device, and wherein the synchronization signal comprises information about a first time point of transmitting the synchronization signal at the first device, and a first one of said at least one time offset is determined based on the first time point, the fourth time point, a second time point of receiving said synchronization signal at the first second device, and a third time point of transmitting said request message from the first second device.

6. A method as claimed in claim 5, wherein the first time offset is determined as $$T_{offset\_1}=[(t2-t1)-(t4-t3)]/2.$$

7. A method as claimed in claim 1, wherein the method comprises steps of:
sending a follow up message to a first one of said at least one second device to indicate a first time point of transmitting the synchronization signal, and
upon receipt of a request message from the first second device, transmitting a response message to inform a fourth time point of receiving said request message, and
a first one of said at least one time offset is determined based on the first time point, the fourth time point, a second time point of receiving said synchronization signal at the first one of said at least one second device, and a third time point of transmitting said request message from the first one of said at least one second device.

8. A method as claimed in claim 1, wherein the first device multicasts the next synchronization signal to said at least one second device.

9. A method as claimed in claim 1, wherein the time offset parameter corresponds to each one of said at least one time offset and the first device unicasts a next synchronization signal to each of said at least one second device.

10. A synchronization method for synchronizing a first device with a second device, comprising the steps of:
transmitting a synchronization signal from a first device to a second device;
transmitting a follow up message from the first device to the second device, indicating a first time point of transmitting the synchronization signal;
transmitting a request message from the second device to the first device;
transmitting a response message from the first device to the second device to inform the fourth time point of receiving said request message at said first device;
determining at least one time offset between a clock of the first device and a clock associated with said second device according to the first time point, a second time point of receiving said synchronization signal at the second device, a third time point of transmitting said request message, and the fourth time point;
receiving said at least one time offset from said second device;
determining a time interval between the transmission of the synchronization signal and a next synchronization signal, the synchronization signal and the next synchronization signal being successive synchronization signals transmitted from the first device to the second device, the time interval determined based on a time offset parameter corresponding to said at least one time offset received from said second device; and
at the time interval, transmitting the next synchronization signal from the first device to said second device.

11. A first device for synchronizing with at least one second device, comprising
a transmitter for transmitting a synchronization signal to said at least one second device to determine at least one time offset between a clock of the first device and at least one clock associated with said at least one second device;
a receiver for receiving said at least one time offset from said at least one second device;
at least one processor for determining a time interval between the transmission of the synchronization signal and a next synchronization signal, the synchronization signal and the next synchronization signal being successive synchronization signals transmitted from the first device to the at least one second device, the time interval determined based on a time offset parameter corresponding to said at least one time offset received from the at least one second device, and
wherein the transmitter is further operable to transmit the next synchronization signal from the first device to said at least one second device at the time interval.

12. A non-transitory computer-readable medium storing instructions operable to be executed by a processor to cause the processor to:
transmit a synchronization signal to said at least one second device to determine at least one time offset between a clock of the first device and at least one clock associated with said at least one second device;
receive said at least one time offset from said at least one second device;
determine a time interval between the transmission of the synchronization signal and a next synchronization signal, the synchronization signal and the next synchronization signal being successive synchronization signals transmitted from the first device to the at least one second device, the time interval determined based on a time offset parameter corresponding to said at least one time offset received from the at least one second device; and
at the time interval, transmit the next synchronization signal from the first device to said at least one second device.

13. A non-transitory computer-readable medium as claimed in claim 12, wherein there is only one second device and said time offset parameter equals to said at least one time offset.

14. A non-transitory computer-readable medium as claimed in claim 12, wherein there are more than one second devices, and said time offset parameter equals to an averaging value of said at least one time offset or the smallest one of said at least one time offset.

15. A non-transitory computer-readable medium as claimed in claim 12, wherein the time interval is determined as $$T_{syncinterval}=T_{syncint0}*(t_{ref}/t_{para}) \text{ if } t_{refL} \leq t\text{para} \leq t_{refH}$$

wherein $T_{syncint0}$ is a default time interval of the first device; $t_{ref}$ is a reference time offset; $t_{para}$ is said time offset parameter; $T_{refL}$ and $T_{refH}$ are the lower and upper limits of the time offset parameter respectively.

16. A non-transitory computer-readable medium as claimed in claim 12, wherein the processor is further executed to:
upon receipt of a request message from a first one of said at least one second device, transmit a response message to said first second device to inform a fourth time point of receiving said request message at the first device, and wherein the synchronization signal comprises information about a first time point of transmitting the synchronization signal at the first device, and a first one of said at least one time offset is determined based on the first time point, the fourth time point, a second time point of receiving said synchronization signal at the first second device, and a third time point of transmitting said request message from the first second device.

17. A non-transitory computer-readable medium s claimed in claim 12, wherein the processor is further executed to:

send a follow up message to a first one of said at least one second device to indicate a first time point of transmitting the synchronization signal, and upon receipt of a request message from the first second device, transmit a response message to inform a fourth time point of receiving said request message, and a first one of said at least one time offset is determined based on the first time point, the fourth time point, a second time point of receiving said synchronization signal at the first one of said at least one second device, and a third time point of transmitting said request message from the first one of said at least one second device.

18. A non-transitory computer-readable medium as claimed in claim 17, wherein the first time offset is determined as $$T_{offset\_1}=[(t2-t1)-(t4-t3)]/2.$$

19. A non-transitory computer-readable medium as claimed in claim 12, wherein the first device multicasts the next synchronization signal to said at least one second device.

20. A non-transitory computer-readable medium as claimed in claim 12, wherein the time offset parameter corresponds to each one of said at least one time offset and the first device unicasts a next synchronization signal to each of said at least one second device.

* * * * *